United States Patent
Ramanath et al.

(10) Patent No.: US 8,305,395 B2
(45) Date of Patent: Nov. 6, 2012

(54) COLOR PROCESSING METHOD USABLE IN IMAGING SYSTEMS

(75) Inventors: Rajeev Ramanath, Plano, TX (US); Takeshi Honzawa, Kanagawa-ken (JP)

(73) Assignee: Texas Instruments Incorporated, Dallas, TX (US)

( * ) Notice: Subject to any disclaimer, the term of this patent is extended or adjusted under 35 U.S.C. 154(b) by 1037 days.

(21) Appl. No.: 11/741,972

(22) Filed: Apr. 30, 2007

(65) Prior Publication Data
US 2008/0192151 A1 Aug. 14, 2008

Related U.S. Application Data

(60) Provisional application No. 60/889,645, filed on Feb. 13, 2007.

(51) Int. Cl.
*G09G 5/02* (2006.01)
(52) U.S. Cl. ........................................ 345/604
(58) Field of Classification Search .................. 345/604, 345/603
See application file for complete search history.

(56) References Cited

U.S. PATENT DOCUMENTS

| | | | |
|---|---|---|---|
| 2002/0015110 A1* | 2/2002 | Brown | 348/589 |
| 2005/0083341 A1* | 4/2005 | Higgins et al. | 345/590 |
| 2005/0264547 A1* | 12/2005 | Choi et al. | 345/204 |

OTHER PUBLICATIONS

U.S. Appl. No. 11/403,493, Ramanath, filed Apr. 13, 2006.
U.S. Appl. No. 11/616,170, Ramanath et al., filed Dec. 26, 2006.
U.S. Appl. No. 11/604,599, Ramanath et al., filed Nov. 27, 2006.

* cited by examiner

*Primary Examiner* — Aaron M Richer
(74) *Attorney, Agent, or Firm* — Warren L. Franz; Wade J. Brady, III; Frederick J. Telecky, Jr.

(57) ABSTRACT

In a method embodiment, a method for image processing includes receiving one or more signals indicative of an optical characteristic of one or more respective light beams. A transform is generated based on the received one or more signals. The transform converts a first plurality of image components encoded by a first plurality of colors to a second plurality of image components encoded by a second plurality of colors.

15 Claims, 4 Drawing Sheets

COLOR PROCESSING METHOD USABLE IN IMAGING SYSTEMS

CROSS REFERENCE TO RELATED APPLICATIONS

This application claims the benefit of priority under 35 U.S.C. §119(e) of U.S. Provisional Patent Application Ser. No. 60/889,645, which was filed on Feb. 13, 2007, which is incorporated herein by reference for all purposes.

TECHNICAL FIELD

This disclosure relates to imaging systems, and more particularly, to a color processing method for use in imaging systems.

BACKGROUND

Various techniques for producing images exist. For example, an imaging system may use an image engine having an array of individually addressable pixels, such as reflective and deflectable micromirrors, reflective and movable membranes (e.g., IMOD), liquid-crystal cells (LCDs), liqiud-crystal-on-silicon cells (LCOS), emissive cells (e.g., plasma cells), or organic light-emitting diodes (OLEDs). The imaging systems further may use a passive display screen or an active display screen. Some imaging systems process multiple color input components into output stimuli having an increased number of color components. The characteristic quality and divergence of such output stimuli, however, limits the performance and practicality of some imaging systems for a variety of reasons.

SUMMARY

In a method embodiment, a method for image processing includes receiving one or more signals indicative of an optical characteristic of one or more respective light beams. A transform is generated based on the received one or more signals. The transform converts a first plurality of image components encoded by a first plurality of colors to a second plurality of image components encoded by a second plurality of colors.

Technical advantages of certain embodiments of the present disclosure may provide a universal image processing engine configured to self-initialize and adapt to any of a variety of color output stimuli commensurate with various imaging systems. Other technical advantages of certain embodiments of the present disclosure include methods of rendering images in a manner that is adaptive to the actual optical characteristics of light generated by an imaging system. Such embodiments may enhance image quality and brightness while reducing the incidence of visual artifacts. Some embodiments may provide a color module that continually perfects and updates output stimuli by responding in real-time to the effects of executed color transformations, thereby enabling intelligent adaptation.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

In accordance with the teachings of the present disclosure, color processing methods usable in imaging systems are provided. In one particular embodiment, a color processing method generally converts input image components having red, green, and blue encoding into output image components having six-color encoding commensurate with an imaging system. The conversion may be based in part on a determination of the actual hue of light generated by the imaging system. Particular embodiments specified throughout this document are intended for example purposes only, and are not intended to limit the scope of the present disclosure. In particular, this document is not intended to be limited to a multiprimary microdisplay based system that takes as input three primary color vectors, wherein the microdisplay is a digital micromirror device (DMD). Additionally, the color processing methods are applicable to a variety of imaging systems including digital and analog imaging systems. Examples of imaging systems include front projectors and rear projection television. The color processing methods, however, are also applicable in imaging applications other than display.

Figure 1A:
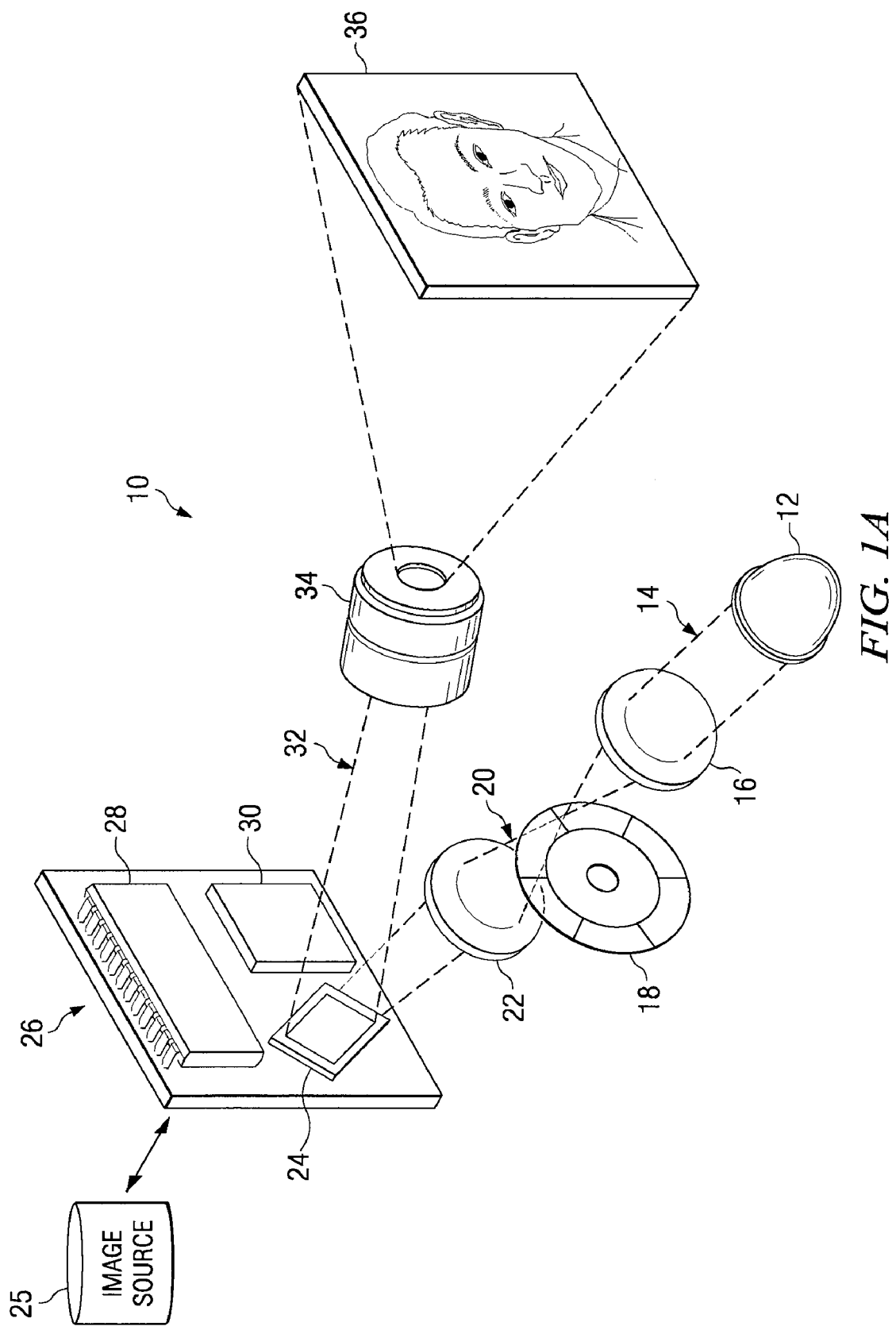
FIG. 1A is a schematic diagram of one embodiment of an imaging system according to the teachings of the present disclosure.

FIG. 1A is a schematic diagram of one embodiment of a portion of an imaging system 10 according to the teachings of the present disclosure. In this example, imaging system 10 generally includes a light source 12 configured to produce a light beam 14 that may be directed by optics 16 through a color wheel 18. The rotation of color wheel 18 sequentially filters light beam 14 to output colored light beams 20, which are directed by optics 22 to an image engine 24. Image engine 24 renders colored light beams 20 in the form of an image, which in this example involves generating a spatially modulated light beam 32 in response to signals received from an image processing engine 26. The modulated light beam 32 is directed by a projection lens 34 to a surface 36 for the display of field sequential images. More specifically, image frames rendered as uniquely colored, modulated light beams 34 may be displayed on surface 36 in rapid sequence, such that an observer sees a composite "full color" image.

In this example, light source 12 is a high-power mercury lamp that generates white light; however, any suitable light source(s) may be used. For example, alternative embodiments may use lasers or light-emitting diodes (LED), some of which are capable of generating light beams of various colors and/or combining their output with similar components to generate additional colors. Additionally, some alternative embodiments may use optics, such as one or more prisms, to split a light beam into different color components. Some such alternative embodiments, therefore, may provide different colored light beams 20 to image engine 24 without the use of color wheel 18. As illustrated in FIG. 1, however, plural sections of color wheel 18 sequentially rotate within the path of light beam 14, such that color wheel 18 selectively transmits respectively colored light beams 20 (e.g., red, green, blue, cyan, magenta, yellow, white and so forth). Optics 22 direct colored light beams 20 to image engine 24.

Image engine 24 generally refers to any device capable of rendering images based on signals received from image processing engine 26. Image engine 24 may have an array of individually addressable pixels, such as reflective and movable membranes (e.g., IMOD), liquid-crystal cells (LCDs), liquid-crystal-on-silicon cells (LCOS), emissive cells (e.g., plasma cells), or organic light-emitting diodes (OLEDs). Image engine 24 also may comprise a spatially tessellated pattern of sub-pixels either in the form of red-green-blue triplets along with an achromatic sub-pixel, which may render an achromatic color on screen either using only the achromatic sub-pixel, or a desired combination of the other colored sub-pixels. In this example, however, image engine 24 is a DMD having an array of reflective and deflectable micromirrors. Electrostatic forces aid in transitioning each micromirror between "on" state and "off" state positions. Micromirrors in an "on" state position direct colored light beams 20 along the modulated light beam 32 path, while micromirrors in an "off" state position direct light toward a light absorber (not explicitly shown). As explained further below with reference to FIG. 1B, a light sensor 46 may be placed within the light path of "off" state mirrors, thereby enabling feedback regarding the optical characteristics of unused portions of colored light beams 20 without interfering with modulated light beam 32 used for imaging.

Several industry standards exist for input stimuli that may be used to render images and video. These input stimuli typically use three or more color vectors to define individual picture elements of an image. The individual picture elements of an image are referred to herein as image components. In some embodiments, the image components received as input stimuli may differ from the image components used to render an image. For example, image processing engine 26 may transform received image components into a different number of output components having additional and/or different color vectors, in accordance with the components and operation of a particular imaging system 10. More specifically, a variety of different imaging systems 10 may render images using a wide assortment of colored light beams generated by various light sources 12, color wheels 18, optics, cells, and/or pixels. For example, one particular imaging system 10 may use a color wheel 18 having red, green, blue, and white segments; another imaging system 10 may use a color wheel 18 having red, green, blue, cyan, magenta, and yellow color segments; and yet another imaging system 10 may use red, green, and blue LEDs in overlapping sequence to generate multiprimary-colored light. Accordingly, the teachings of some embodiments of the present disclosure provide a universal image processing engine 24 that may be configured to self-initialize and adapt to any of a variety of color output stimuli commensurate with various imaging systems 10.

Furthermore, imaging systems 10 may generate light beams (e.g., light beams 20 and 32) having optical characteristics that vary for a variety of other reasons. For example, process variation of a particular production line may broaden actual hue and/or optical smoothness distributions of the light used to render images; and such process variation may differ between production lines. Some imaging systems 10 may generate light beams (e.g., light beams 20 and 32) with optical characteristics that change over time. Accordingly, the teachings of some embodiments of the present disclosure recognize methods of rendering images in a manner that is adaptive to the actual optical characteristics of generated light. Such embodiments may enhance image quality and brightness while reducing the incidence of visual artifacts. Additional details regarding image processing engine 26 are described below with reference to FIG. 1B.

Figure 1B:
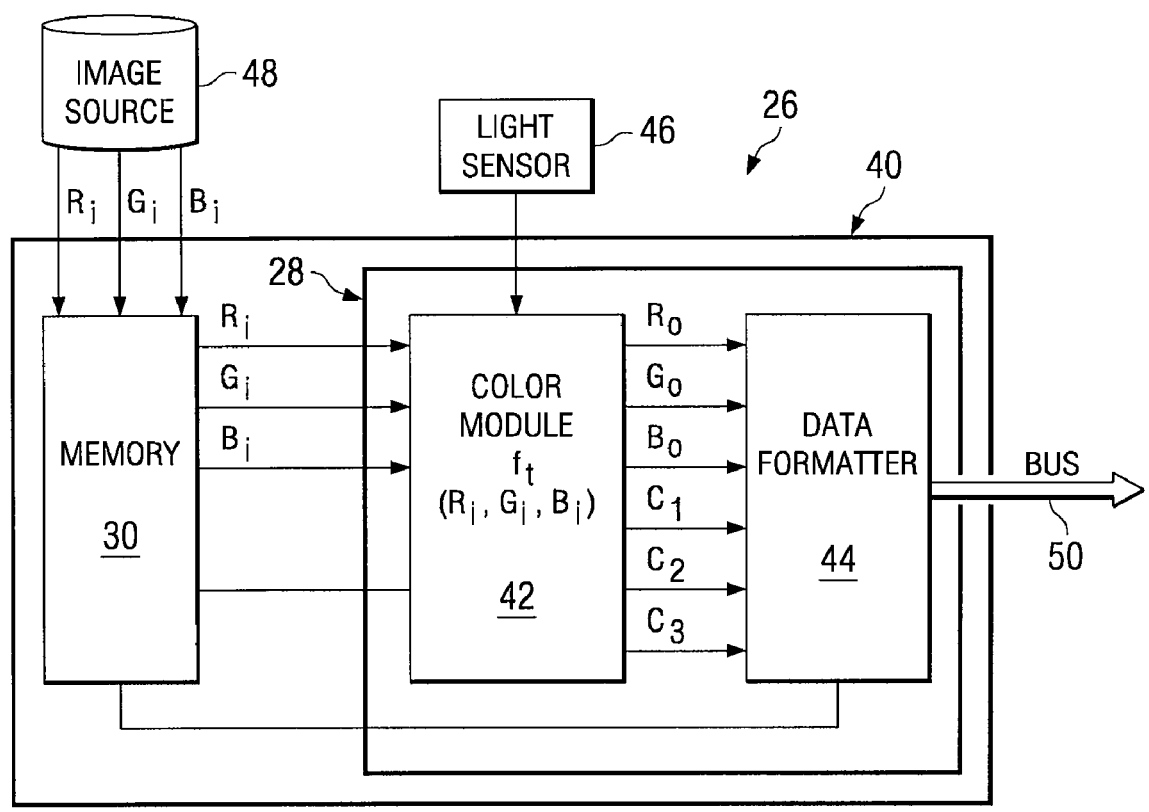
FIG. 1B is a block diagram of one embodiment of an image processing engine that forms a portion of the imaging system of FIG. 1A.

FIG. 1B is a block diagram of one embodiment of a portion of the image processing engine 26 that is a part of the imaging system 10 of FIG. 1A. In this example, image processing engine 26 includes a processor 28 and memory 30 coupled to a common circuit board 40. Processor 28 has a color module 42 and a formatter module 44 generally capable of transforming received input image stimuli or data. The transformation is based in part on signals received from light sensor 46, as explained further below. In operation, image processing engine 26 generally retrieves (or receives) input image signals from image source 48, which may or may not be a member of imaging system 10; transforms the input image in manner adapted to some optical property of imaging system 10; and formats the transformed image signals in a manner interpretable by image engine 24. Although the block diagram of FIG. 1B illustrates image processing engine 26 in a particular configuration, any suitable configuration may be used without departing from the scope of the present disclosure. For example, separate devices may perform the functions of color module 42 and formatter module 44; such functions may be performed by a single module within processor 28; and/or color module 42 may retrieve (or receive) the signal from light sensor 46 via memory 30.

At some point or at certain intervals, color module 42 may determine various optical characteristics of light used by imaging system 10 to render images. For example, color module 42 may determine the hue, luminance, chrominance, intensity, frequency, and/or smoothness of a light beam (e.g., light beams 20 and 32) used or generated by imaging system 10. In this particular embodiment, color module 42 executes an initialization that determines the hues of colored light beams 20, which are in the spectrum of red, green, blue, cyan, magenta, and yellow. If color wheel 18 actually had five color segments, for example, or if laser light sources 12 produced three colors, such differences would have been determined during this initialization stage. Color module 42 may store these determinations in memory 30 for use during the application of the color transformation algorithms explained below. The optical characteristic determinations may involve signals generated by light sensor 46.

Light sensor 46 generally refers to any device or devices capable of generating a signal based on an optical characteristic of a light beam. Light sensor 46 may be positioned in any suitable light path (e.g., in the paths of light beams 20 and/or 32) and sense any suitable corresponding optical characteristic (e.g., hue, luminance, chrominance, intensity, frequency, smoothness and so forth). For example, optics 22 may direct a portion of colored light beams 20 toward light sensor 46. In this particular example, however, light sensor 46 senses the hue of light directed by the "off" state micromirrors of image engine 24, and generates a signal accordingly. In this manner, light sensor 46 enables hue detection and feedback without interfering with modulated light beam 32 or sacrificing brightness of a rendered image.

In this example, color module 42 uses the previously determined hue information to transform three-vector Ri, Gi and Bi image input components into six-vector image output components Ro, Go and Bo Cl, C2, and C3 commensurate with imaging system 10; however, the teachings of present disclosure can be used in any suitable application that generates N-dimensional color vectors from color vectors of smaller dimension, for example, from four, five-, and so forth dimensional color vectors to N dimensional color vectors. Color module 42 may retrieve (or receive) the Ri, Gi and Bi color vectors, for example, from a buffer in memory 30 operable to temporarily store the same as it is retrieved (or received) from image source 48.

In this example, image source 48 provides image components to imaging processing engine 26 in the form of pixel-by-pixel data (pixel data). Each image component is encoded by red, green, and blue (RGB) input vectors represented respectively in FIG. 1B as Ri, Gi and Bi. Although this example uses RGB input stimuli, image processing engine 26 may be configured to receive any suitable input format, including future formats, using any suitable number of color vectors. For example, image source 48 may alternatively provide image data to image processing engine 26 in the form of luminance-bandwidth chrominance (YV), luminance-chroma (blue)-chroma (red) (YCbCr), or analog version of YCbCr (YPbPr). In operation, color module 42 may perform real-time transformation of input stimuli Ri, Gi and Bi received from image source 48 into output stimuli Ro, Go, and Bo C1, C2, and C3, which is communicated to data formatter 44.

Data formatter 44 generally transforms the output of color module 42 from one format into the proper format that can be directly used by imaging engine 24. In this example, data formatter 44 is capable of transforming pixel data into bit-plane-by-bitplane data (bitplane data). Data formatter 44 communicates the transformed and formatted output stimuli with image engine 24 through bus 50, which may be formed on a surface of circuit board 40.

The example above functions of color module 42 and data formatter 44 can be implemented in an electronic circuit device (as hardware, firmware, or software) that forms a portion or all of image processing engine 26. The electronic circuit can be field-programmable gate-arrays (FPGA), a digital signal processor (DSP), or an application-specific integrated circuit (ASIC). Alternatively, the functions can be implemented as a software module having computer-executable instructions; and the software can be stored in a computer-readable medium. Some example methods for implementing several of the above functions are illustrated below with reference to FIGS. 2 through 3B.

Figure 2:
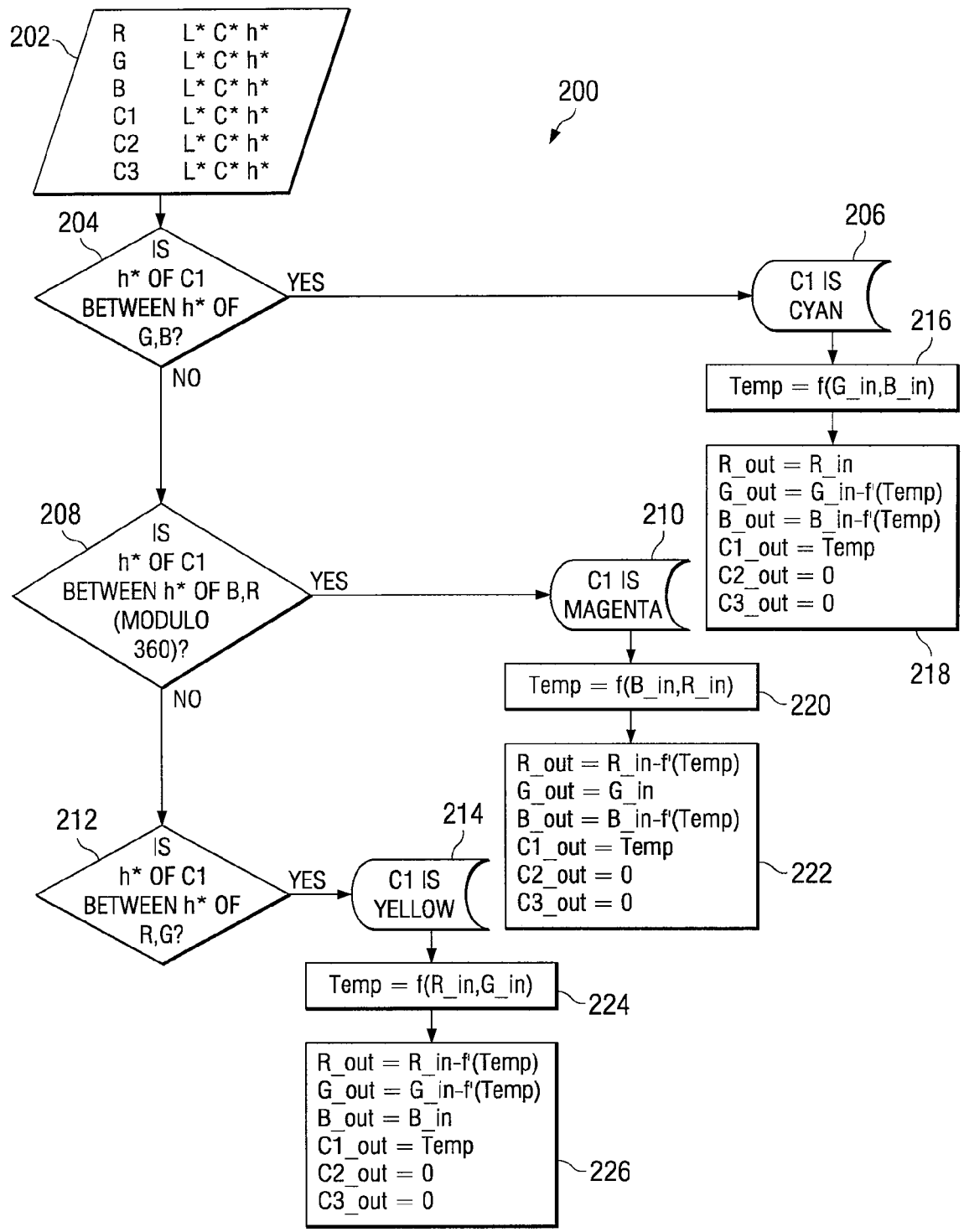
FIG. 2 is a flow chart showing steps executed by the image processing engine of FIG. 2 according to one embodiment of the present disclosure.

FIG. 2 is a flow chart 200 showing steps that may be executed by the color module 42 of image processing engine 26 according to one example embodiment. Flow chart 200 begins in block 202, where an array of six input variables R, G, B, C1, C2, and C3 having respective optical characteristic values L*C*H* are received (or retrieved). In this example, L*, C*, and H* denote luminance, chrominance, and hue respectively, as sensed by optical sensor 46, however, any suitable optical characteristic(s) may be used. Although not explicitly shown in FIG. 2, color module may first determine that R, G, and B correspond respectively to red, green, and blue colors, as interpreted by the L*C*H* values. Some embodiments, however, may presuppose the same. In other embodiments, R, G, and B may represent colors other than red, green, and blue.

In this example, a determination is made as to whether the hue value of C1 is between the hue values of G and B in block 204. If this is so, color module 42 concludes that C1 corresponds to cyan in block 206 and proceeds using subroutine 1 for subsequent C1 color transformations; otherwise a determination is made as to whether the hue value of C1 is between the hue values of B and R in block 208. If this is so, color module 42 concludes C1 corresponds to magenta in block 210 and proceeds using subroutine 2 for subsequent C1 color transformations; otherwise a determination is made as to whether the hue value of C1 is between the hue values of R and G in block 212. If this is so, color module 42 concludes C1 corresponds to yellow in block 214 and proceeds using subroutine 3 for subsequent C1 color transformations. The above generalized example may be further applied to C2, C3, and so forth.

In this example, subroutine 1 of color module 42 proceeds under the conclusion that C1 corresponds to cyan. Accordingly, when image processing engine 28 receives input stimuli, color module 42 computes a first function f ( ) on a G_in and B_in value and assigns the output (Temp) to a C1_out channel. The first function f ( ) is represented in step 216 as f(G_in, B_in). One example first function is a minimum operator on the G_in and B_in values; however any suitable function may be used, such as, for example, a lookup table. In step 218, subroutine 1 of color module 42 applies a second function f' ( ) on the C1_out channel and subtracts the result from the G_in and B_in values. The second function on the Temp value stored in C1 out is represented in step 218 as f' (Temp). Example second functions f' ( ) include power laws, sigmoidal, linear functions, and/or single or multi-dimensional lookup tables. Two example lookup tables are illustrated in FIGS. 3A and 3B.

Figure 3A:
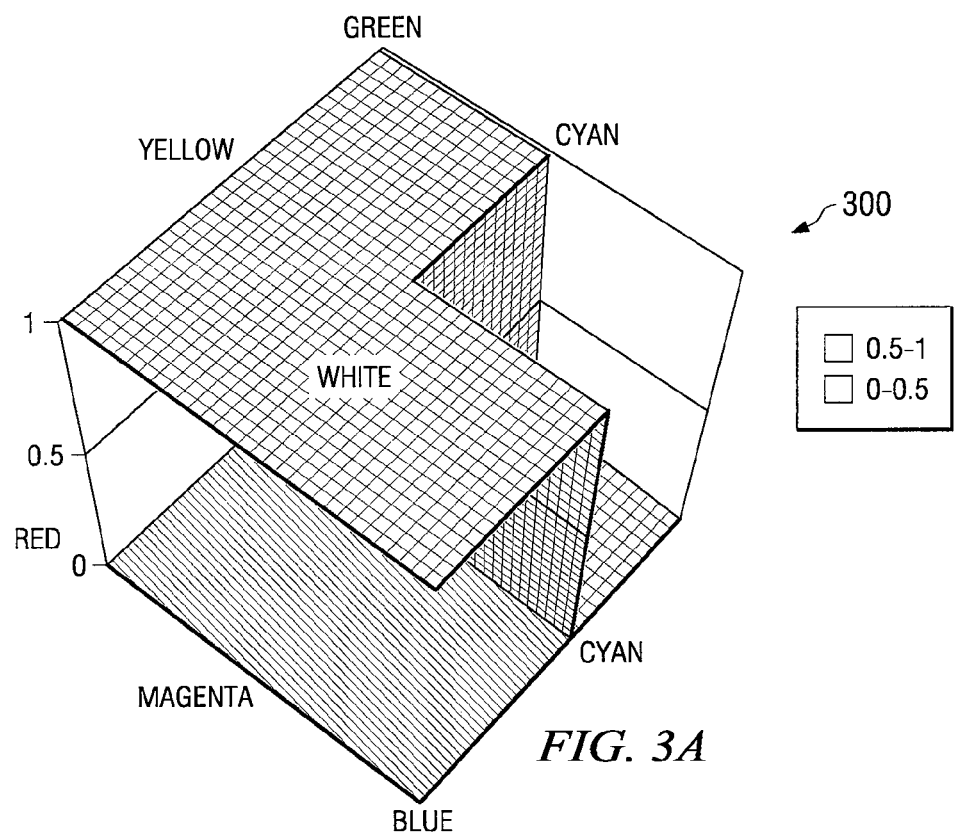
FIGS. 3A and 3B are plots of example lookup tables that may be used to execute the steps of the flowchart of FIG. 2.

FIG. 3A is a plot of one embodiment of a lookup table 300 that may be used to execute the steps of the flowchart 200 of FIG. 2. Lookup table 300 illustrates a simple two-dimensional lookup table that uses unity values for the entire color space. In this manner the second function f' ( ) always returns Temp as a value. Alternative embodiments may return hue dependent values using a non-linear trickle surface which may enhance the performance of some imaging systems 10. One example of such a trickle surface is illustrated in FIG. 3B.

Figure 3B:
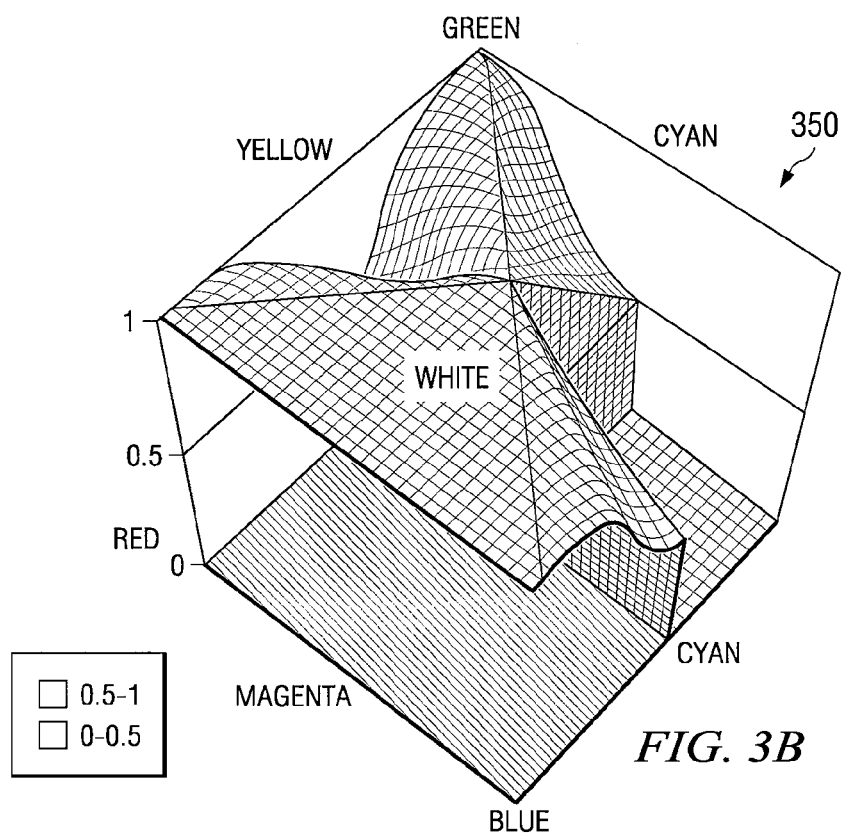

FIG. 3B is a non-linear, three-dimensional plot of one embodiment of a two-dimensional lookup table 350 having a trickle surface that may be used to execute the steps of the flowchart 200 of FIG. 2. More specifically, the values represented in illustrated trickle surface may be used to implement second function f' ( ) of FIG. 2. For example, the trickle surface may be used to determine how much green and blue will "trickle" into cyan during the rendering of cyan-colored image components.

In this example, the trickle surface provides a scalar factor of 0.5 for cyan. Accordingly, if color module 42 receives G_in and B_in values of 255 for a cyan image component and determines a corresponding Temp value as 255, the trickle surface function would assign 127.5 to the G_out and B_out values. The other colors can follow these same general principles as applied to the trickle surface. As illustrated in FIG. 3B, all "pure colors" have unity trickle values except cyan and yellow. The term "pure colors" generally refers to the axial or mid-axial color points illustrated in plots 300 and 350.

In the context of the particular example embodiment of FIG. 1, subroutine 1 may be used to determine the amount of time a micromirror is in an "on state" position while green, blue, and cyan segments of color wheel 18 intersect light beam 14. Thus, color module 42 may execute the steps of FIG. 2 using the trickle surface of FIG. 3B to transform Gi and Bi input stimuli of a cyan-colored image component into Go, Bo, and C1 output stimuli for the rendering of same cyan-colored image component. In this manner, the rendered image component may be perceived as a brighter cyan, thereby enhancing image quality while reducing image artifacts.

Thus, some example methods may map between color spaces of different dimensionality using functional implementations, or through single- or multiple-dimensional lookup tables. Implementation of the methods described herein potentially simplifies the color transform or mapping process, which is conventionally done through a much larger, static (i.e. non-adaptive) lookup table. Some input colors that may be transformed using color module 42 may be interpolated using linear, barycentric interpolation, and the like. Alternatively, the methods disclosed herein may be implemented using an abstracted version of the trickle surface described by ramps between red and white, green and white, and so forth; and the intermediate colors are interpolated from these constituent trickle color ramps.

The example embodiments disclosed herein may apply to any of a variety of applications. For example, some methods may be used in output systems, such as displays and printers. Furthermore, the example embodiments may enable real time generation of color transforms based adaptively on noise content of an image or video scene. For example, depending upon the conditions for optimal performance of the system with regard to noise, the amount of RGB primary colors trickled into the other colors may be changed on a frame-by-frame basis or through a mechanism that favors an adaptively varying trickle surface at much slower rates. Color module may continually perfect and update output stimuli by responding in real-time to the effects of executed color transformations, thereby enabling intelligent adaptation for stunning performance and image quality.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method for producing images in an imaging system having a light engine with an array of individually addressable pixels for modulating light from a light source generating light beams of three primary colors and at least one secondary color, comprising:
    using a light sensor, sensing actual hue values of the light beams at least for the at least one secondary color;
    receiving input image signals from an image source, the input image signals including vector image input components for displaying images using the three primary colors;
    using circuitry, transforming the vector image input components into vector image output components of output image signals for displaying images using the light beams of the three primary colors and the at least one secondary color, the transforming including:
        determining which two of the three primary colors have hue values between which the sensed actual hue value of the at least one secondary color lies;
        generating a vector image output component for the at least one secondary color from the vector image input components of the determined two primary colors; and
        generating vector image output components for the determined two primary colors from the vector image input components of the two primary colors adjusted for the vector image output component generated for the at least one secondary color; and
    addressing the pixels of the light engine for modulating the light beams to produce the images using the vector image output components of the output image signals.

2. The method of claim 1, wherein actual hue values of the light beams are also sensed for the three primary colors.

3. The method of claim 2, further comprising also sensing actual luminance and chrominance values of the light beams for the three primary colors and the at least one secondary color.

4. The method of claim 2, wherein determining the two primary colors comprises determining which two primary colors have sensed actual hue values between which the sensed actual value of the at least one secondary color lies.

5. The method of claim 4, wherein the three primary colors are red, green and blue; and the at least one secondary color is cyan, magenta or yellow.

6. The method of claim 4, wherein the light source generates light beams of three primary colors and three secondary colors; actual hue values of the light beams are sensed for the three primary colors and the three secondary colors; a respective two primary colors are determined which have actual sensed hue values between which the sensed actual hue value of each of the secondary colors lies; a vector image output component is generated for each of the secondary colors from the vector image input components of the respective determined two primary colors; and vector image output components are generated for the respective determined two primary colors from the vector image input components of the respective determined two primary colors adjusted for the vector image output component generated for each corresponding secondary color.

7. The method of claim 6, wherein the three primary colors are red, green and blue; and the three secondary colors are cyan, magenta and yellow.

8. The method of claim 1, wherein the circuitry comprises a processor.

9. The method of claim 1, wherein the three primary colors are red, green and blue; and:
    if it is determined that the two colors are green and blue, the at least one secondary color is identified as cyan;
    if it is determined that the two colors are blue and red, the at least one secondary color is identified as magenta; and
    if it is determined that the two colors are red and green, the at least one secondary color is identified as yellow.

10. The method of claim 9, wherein the vector image output component for the at least one secondary color is generated from a first lookup table.

11. The method of claim 10, wherein the vector image output components for the determined two primary colors are generated from a second lookup table.

12. The method of claim 11, wherein the vector image output components for the determined two primary colors are generated by subtracting a value from the second lookup table from the vector image input components for the determined two primary colors.

13. The method of claim 1, wherein the vector image output component for the at least one secondary color is generated from a first function applied to the vector image input components for the determined two primary colors.

14. The method of claim 13, wherein the vector image output components for the determined two primary colors are generated by subtracting from the vector image input components of the determined two primary colors, a value established using a non-linear surface representation of how much of the determined two primary colors will trickle into the at least one secondary color during rendering of the image using the at least one secondary color vector image output component.

15. A method for producing images in an imaging system having a light engine with an array of individually addressable pixels for modulating light from a light source generating light beams of n different output colors, comprising:
    using a light sensor, sensing actual hue values of the light beams for the n different output colors;

receiving input image signals from an image source, the input image signals including vector image input components for displaying images using a number less than n of different input colors;

using circuitry, transforming the vector image input components into vector image output components of output image signals for displaying images using the light beams of the n different output colors, the transforming including:

for output colors different from input colors, determining respective twos of the input colors having hue values between which the sensed actual hue values of the output colors lies;

for the output colors different from input colors, generating a respective vector image output component for the output colors from the vector image input components of the determined respective twos of the input colors; and for each of the determined respective twos of the input colors, generating vector image output components from the vector image input components of the twos of the input colors adjusted for the vector image output component generated for the corresponding respective different he output color; and addressing the pixels of the light engine for modulating the light beams to produce the images using the vector image output components of the output image signals.

* * * * *